United States Patent [19]

Foehse et al.

[11] Patent Number: 5,151,283
[45] Date of Patent: Sep. 29, 1992

[54] HIGH SOLUBLE FIBER BARLEY EXPANDED CEREAL AND METHOD OF PREPARATION

[75] Inventors: Karen B. Foehse; John D. Efstathiou, both of Plymouth; James R. Stoll, Maple Grove, all of Minn.

[73] Assignee: General Mills, Inc., Minneapolis, Minn.

[21] Appl. No.: 548,463

[22] Filed: Jul. 3, 1990

Related U.S. Application Data

[63] Continuation-in-part of Ser. No. 437,229, Nov. 16, 1989, Pat. No. 5,063,078 which is a continuation-in-part of Ser. No. 330,245, Mar. 29, 1989, Pat. No. 5,063,078, which is a continuation-in-part of Ser. No. 446,247, Dec. 5, 1989, Pat. No. 5,024,996.

[51] Int. Cl.⁵ .................................. A23L 1/18
[52] U.S. Cl. ........................... 426/93; 426/302; 426/559; 426/560; 426/618; 426/619; 426/620; 426/621; 426/804
[58] Field of Search .................. 426/28, 618, 619, 93, 426/96, 62, 445, 559, 560, 804, 620, 621

[56] References Cited

U.S. PATENT DOCUMENTS

| | | | |
|---|---|---|---|
| 3,505,076 | 4/1970 | Maloney et al. | 426/621 |
| 4,251,551 | 2/1981 | Van Hulle et al. | 426/94 |
| 4,311,714 | 1/1982 | Goering et al. | 426/28 |
| 4,348,379 | 9/1982 | Kowalsky et al. | 424/34 |
| 4,350,714 | 9/1982 | Duvall | 426/559 |
| 4,428,967 | 1/1984 | Goering et al. | 426/28 |
| 4,497,840 | 2/1985 | Gould et al. | 426/560 |
| 4,568,557 | 2/1986 | Becker et al. | 426/618 |
| 4,620,981 | 11/1986 | Gordon et al. | 426/448 |
| 4,759,942 | 7/1988 | Von Fulger | 426/621 |
| 4,777,045 | 10/1988 | Vanderveer et al. | 424/195.1 |
| 4,804,545 | 2/1989 | Goering et al. | 426/28 |
| 4,857,339 | 8/1989 | Maselli et al. | 426/28 |

FOREIGN PATENT DOCUMENTS 0068229 6/1982 European Pat. Off.

*Primary Examiner*—Jeanette Hunter
*Assistant Examiner*—Mary S. Mims
*Attorney, Agent, or Firm*—John A. O'Toole

[57] ABSTRACT

Disclosed are puffed, barley based ready-to-eat breakfast cereal products having a high soluble fiber content. The cereal products are characterized by specific densities of about 0.2 to 0.35 g/cc. The soluble fiber content of the cereal compositions is about 3 g/oz or about 10%. The insoluble fiber content is less than about 1.5 g/oz or about 5%. The soluble fiber to insoluble fiber ratio is at least about 2:1. The total insoluble fiber content is less than about 19%. The total fat content of the puffed cereal is less than about 4%. The cereal comprises about 15% to 90% of a barley flour fraction high in soluble fiber. Also disclosed are processes for preparing the puffed barley R-T-E cereals.

30 Claims, No Drawings

HIGH SOLUBLE FIBER BARLEY EXPANDED CEREAL AND METHOD OF PREPARATION

CROSS REFERENCE TO RELATED APPLICATION

This application is a continuation-in-part application to USSN 437,229, filed Nov. 16, 1989, entitled "High Soluble Fiber Barley Fraction and Dry Milling Method of Preparation, now U.S. Pat. No. 5,063,078 as well as a continuation-in-part of U.S. Ser. No. 330,245, filed Mar. 29, 1939, now U.S. Pat. No. 5,026,689 and U.S. Ser. No. 446,247, filed Dec. 5, 1989, now U.S. Pat. No. 5,024,996."

FIELD OF THE INVENTION

The present invention relates to food products and to their methods of preparation. More particularly, the present invention pertains to puffed, barley based R-T-E breakfast cereals of high soluble fiber content and to their methods of preparation.

BACKGROUND OF THE INVENTION

R-T-E cereals are popular packaged goods food items. R-T-E cereals exist in large numbers of varieties. R-T-E cereals, especially whole grain, are known as good sources of fiber. A good description of the literature pertaining to the health discussion on the role of fiber is found in U.S. Pat. No. 4,777,045 (issued Oct. 11, 1988 to Vanderveer et al. and is entitled High Bran Snack) which is incorporated herein by reference. In view of the health interest in fiber, high fiber cereals are increasingly popular. These cereals contain added levels of insoluble fiber sources, especially corn and wheat bran, and range generally from about 2-5 g fiber/oz cereal. Generally, the fiber is predominantly of the insoluble type. Some cereals are formulated from all bran sources and can contain up to 8-10 g/oz fiber. High fiber cereals using purified insoluble fiber sources and artificial sweeteners can even contain as high as 8-13 g fiber/oz of cereal.

While popular, high fiber cereals are not without disadvantages. The primary concern is with the organoleptic qualities of the R-T-E cereal. Generally, as the concentration of fiber increases, the starchy components decrease, adversely affecting the cereals' organoleptic and physical properties. High fiber cereals are often dry, exhibit short bowl lives and yield highly frangible food pieces. In view of the difficulties of formulating R-T-E cereals with high levels of insoluble fiber, the prior art includes many efforts at improving the qualities of insoluble fiber fortified R-T-E cereals. Second, while most fiber rich R-T-E cereals have higher levels of insoluble fibers, present consumer interest is focused upon cereals containing oat bran which is a rich source of soluble fiber. Such high fiber cereals are actually quite low in soluble fiber content.

There is a growing awareness of the health benefits to people associated with soluble fiber consumption, especially reductions in blood serum cholesterol, i.e., antihypercholesterolemic benefits. Total dietary fiber ("TDF") comprises both soluble dietary fiber ("SDF") and insoluble dietary fiber ("IDF"). In addition to insoluble fiber, certain whole grain cereal flours contain soluble fiber which predominantly comprise beta glucans.

Unfortunately, R-T-E cereals, when formulated to be high in soluble fiber typically not only are extremely difficult to manufacture but also exhibit many undesirable attributes which can be quite different from insoluble fiber fortified R-T-E cereals. High soluble fiber formulated R-T-E cereals, especially high beta glucan cereals, are difficult to manufacture because they can absorb undesirably high amounts of moisture during processing. Also, the cereal dough tends to develop very high viscosities. High soluble fiber R-T-E cereals are often gummy or slimy upon consumption with milk, especially when the soluble fiber is derived from oat bran. The slimy texture of the R-T-E cereal results from the highly viscous nature of beta glucan and hydration of the beta glucan at the surface of the cereal when exposed to liquid. Most importantly, such high soluble fiber content cereals lack the organoleptically essential property of crispness.

The present invention is directed towards the provision of a high soluble fiber R-T-E cereal with superior organoleptic attributes or qualities. Surprisingly, the present invention provides such a superior quality high fiber R-T-E cereal which nonetheless contains a high concentration of soluble fiber. Moreover, in preferred embodiments, the present cereal compositions provide high fiber cereals having soluble fiber predominating. The present invention resides in part in the particular selection of barley beta glucan as a soluble fiber source used alone or in combination with oat soluble fiber.

Oats are well known as having relatively high levels of soluble fiber. The SDF content of oat flour ranges from about 3% to 7% depending upon such factors as variety, yield/season, source, etc. The SDF in oats is selectively concentrated in the outermost part of the endosperm close to the bran. Because of this, the oat bran fraction is relatively higher in soluble fiber concentration than whole oats and can range from about 5% to 8%. For this reason, oat bran consumption is enjoying immense and growing popularity. Oat bran is commonly added as a minor constituent to a wide variety of foods and as a major or principal component of various cereal products, both hot cereals and ready-to-eat ("R-T-E") cereals which modestly increases their soluble fiber contents. Unfortunately, due to the sudden increase in popularity, oat bran availability is tight and prices are high.

While popular, such R-T-E cereal products are unpuffed, typically in the form of flakes or shreds. See U.S. Pat. No. 4,497,840 (issued Feb. 5, 1985 to Gould et al.) entitled Cereal Foods Made From Oats and Method of Making. While unpuffed oat bran R-T-E cereal products are popular, it would be desirable to have a puffed oat bran R-T-E cereal. Of course, full oat flour puffed R-T-E cereals are well known and popular (e.g., Cheerios ® brand R-T-E cereal). Such cereals contain certain native levels of oat bran. However, it would be desirable then to substantially fortify the cereal composition to provide an oat bran puffed cereal. Unfortunately, such oat bran fortification materially adversely affects the oat cereal compositions puffability. Indeed, a high oat bran cereal composition, if high in soluble fiber exhibits poor puffability. In view of this disadvantageous property, the art teaches separating out the beta glucan in making of puffed cereal. The art also includes methods for diluting the beta glucan content of oat flour in order to make a puffed R-T-E cereal (see U.S. Pat. No. 4,620,981 entitled Process for Preparing a Highly Expanded Oat Cereal Product, issued Nov. 4, 1986 to Gordon et al.).

In view of the availability, price and poor puffability of oat bran, it would be desirable to have an alternate concentrated source of soluble flour to oat bran. At present, psyllium seed husk flour (about 85% soluble fiber) has been suggested for use as a soluble fiber additive for a large number of food products. While useful, psyllium is also expensive. Moreover, psyllium is an imported foodstuff.

Barley is a widely grown and available, relatively inexpensive, domestic cereal grain. The native soluble fiber content of barley is roughly comparable to that of oats and ranges from about 3% to 7%, again depending upon such factors as variety, etc. However, in view of these similarities, problems regarding puffability can reasonably be expected as well in cereals with high levels of barley beta glucan. Moreover, another problem with barley is that in contrast to oats wherein the oat bran fraction is distinctly higher in soluble fiber, barley bran is not. The soluble fiber distribution in barley is more complex. Barley soluble fiber is concentrated in the cell walls of the endosperm, however, the soluble fiber distribution is more uniform throughout the barley endosperm or grain relative to the soluble fiber distribution in oats. Thus, unlike oat bran, barley bran is not usefully higher in soluble fiber content. Unfortunately then, due to these and other differences between grains, the art's teaching regarding milling and especially oat milling generally fails to provide methods for preparing barley fractions relatively richer (i.e., greater than about 7%) or leaner in soluble fiber content. Methods and techniques useful in processing other cereal grains provide little actual useful guidance in this respect due to the distinctive nature of barley.

The prior art, however, does include teachings relative to at least the second of the above noted problems and includes one known barley processing method to provide a purified beta glucan content barley fraction. This known processing method involves an extremely expensive and wet processing method and is described in U.S. Pat. No. 4,804,545 entitled Production of Beta Glucan, Bran, Protein, Oil and Maltose Syrup from Waxy Barley (issued Feb. 14, 1989 to Goering et al.). The wet processing techniques therein described involve improvements in wet barley processing methods described in U.S. Pat. Nos. 4,311,714 and 4,428,967. However, no commercial facility now exists which can practice the process on a commercial scale; that is, the method cannot be used with existing milling equipment. Moreover, yields are low. Finally, the high soluble fiber material obtained has gum-like properties which make the soluble fiber difficult to incorporate at high levels in a puffed cereal.

Other high fiber food products containing various fiber sources are well known. For example, U.S. Pat. No. 4,568,557, to Becker et al., discloses a snack food product prepared by pre-mixing a dietary fiber with a food grade oil; premixing a compound coating containing a fractionated fat, sweetener, milk solids, yogurt, and a flavoring agent; blending the two pre-mixtures and adding a cereal product and a dried fruit or nut; and extruding the resulting mixture into a desired shape.

European patent application No. 0068229, to Kleinert, discloses the addition of the seed coats (episperm) of cocoa beans in finely powdered form, to dough, bread, snacks, and chocolate to increase bulk and stimulate the intestinal tract.

U.S. Pat. No. 4,348,379, to Kowalsky, discloses a dietetic composition for natural digestion regulation containing whole fleawort seeds, whole linseed, wheat bran, lactose, a binding agent based on natural rubber, flavor and food color additives. The preferred binding agent is gum arabic.

While these references disclose compositions of improved palatability, the taste of most products, especially R-T-E cereals, containing a sufficient amount of fiber, especially soluble, to be efficacious continues to be a problem. Those products which are particularly rich in fiber generally employ a fat or oil to increase the palatability of the products to mask partially the dryness and/or grittiness of most fiber sources.

Thus, it is quite surprising that a high soluble fiber, high insoluble fiber, crunchy, organoleptically pleasing efficacious R-T-E cereal can be obtained which does not require high levels of a fat ingredient.

In one method aspect, the present invention provides methods for preparing such novel R-T-E cereal products. In another method aspect, the present invention resides in methods for reducing people's blood serum cholesterol by a regimen of once daily consumption of the present R-T-E cereals.

SUMMARY OF THE INVENTION

In its product aspect, the present invention resides in cooked cereal dough compositions useful for the preparation of puffed, barley R-T-E cereals or other cereal products which nonetheless have high levels of soluble fiber, to pellet/intermediate products and to the finished R-T-E puffed cereals themselves.

The cereal compositions have a soluble fiber content of about 1 to 5.5g/oz or about 3% to 20%. The insoluble fiber content is less than about 1 g/oz or about 7% or below. The soluble fiber to insoluble fiber weight ratio is at least about 1:1. The total fat content of the cereal composition is less than about 4%. The cereal comprises about 30% to 90% of a barley flour high in soluble fiber. The cereals essentially comprise less than about 7% oat beta glucan.

In another product aspect, the present invention resides in pellets or half products useful in the preparation of puffed R-T-E cereals or puffed fried snacks. The pellets have moisture contents ranging from about 9% to 13%. The present pellets are especially useful in the provision of R-T-E cereals. The R-T-E cereals are characterized by bulk densities of about 0.05 to 0.15 g/cc.

In its method aspect, the present invention resides in methods for forming the cooked cereal doughs, pellets and R-T-E cereals. The present methods comprise the essential steps of A) forming an homogeneous mixture of dry cereal ingredients and controlled amounts of water, B) cooking the blend to form a cooked cereal dough, C) forming the dough into shaped and sized pieces to form cereal pellets, D) drying the pellets, and E) puffing the pellets to form the present R-T-E cereals.

DETAILED DESCRIPTION OF THE INVENTION

In its composition aspect, the present invention resides in cooked cereal dough compositions useful in the preparation of puffed, barley based R-T-E cereals having high levels of soluble fiber, to the puffed R-T-E cereals themselves and to pellets or half products. In its method aspect, the present invention resides in methods for preparing the puffed, barley R-T-E cereals. Each of the product ingredients and method of preparation steps are described in detail below.

Throughout the specification and claims, percentages are by weight and temperatures in degrees Fahrenheit unless otherwise indicated.

Forming a Dry Blend of Cereal Ingredients

In the first essential step of the present method of cereal product preparation, a dry blend is made of the essential cereal product ingredients.

The first principal essential cereal product ingredient is a barley flour fraction high in soluble fiber. Barley ingredients useful herein are described in detail in the parent application referenced above and is referred to herein as the high beta glucan barley flour. Briefly, however, while the beta glucan content of conventional barley flour ranges from about 1% to 8%, more particularly about 3% to 7%, the high beta glucan content barley flours useful herein are essentially characterized by beta glucan contents of about 15% to 50%, preferably about 15% to 30% of the flour. The present high beta glucan content barley flours are to be distinguished from the concentrated beta glucan gums produced by the processes of the prior art which can range from 60% to 80% by weight barley beta glucan. The present barley flours have protein, and ash concentrations comparable to conventional barley flour. However, the present barley flours have soluble fiber contents or concentrations enriched at the expense of substantially equivalent reductions in starch content.

Importantly, however, in the preparation of a puffed R-T-E cereal, it has been found surprisingly important to select those high beta glucan content flours which are further additionally characterized by a relatively lower insoluble fiber content. Excessive levels of insoluble fiber in combination with the high level of soluble fiber unfortunately adversely affect puffed volume, which in turn adversely influences the cereal products appearance, texture and palatability. Useful barley flours herein are further essentially characterized by insoluble fiber levels sufficiently low such that when used within the specified ingredient ranges the cereal composition has a total insoluble fiber content of less than 7%. Better results in terms of R-T-E cereal piece organoleptic attributes are obtained when the cereal composition has an insoluble fiber content of less than 5%, and for best results, less than 3.5%. Good results are obtained when an 85% extraction barley flour is employed. However, a flour with an extraction between 70% and 80% is preferred with particular values selected based in part upon the variety employed.

Useful high beta glucan content barley flours of low insoluble fiber content herein are essentially characterized by a soluble fiber to insoluble fiber ratio of at least 1:1, preferably at least 2:1 and for best results above 3:1. Since the insoluble fiber is contributed primarily by the barley bran or endicarp, in the most preferred embodiment the barley kernels are first milled or pearled to remove the exterior kernel portion or bran. If the barley is pearled to remove the exterior 20%, the flour resulting from such pearled barley is referred to as "80% extraction" flour. Increasing insoluble fiber adversely affects the volume of the puffed cereal product.

In its broadest scope, the present cereal compositions essentially comprise about 15% to 90% barley flour. The precise level employed will, of course, depend upon many factors. Among these factors, the most important is the desired barley beta glucan soluble fiber concentration of the cereal composition. For best results in terms of antihypercholesterolemia, the present cereal compositions should have barley beta glucan contents as high as practical. However, the desire for such benefits must be balanced against the cost, palatability and puffability of such compositions. Good results are obtained when the barley beta glucan content of the cereal composition ranges from about 3% to 20%, or alternatively expressed, 1 to 5.5 g/oz. Better results are obtained when the beta glucan content ranges from about 7% to 20% (2 to 5.5 g/oz) and for best results about 10% to 20% (3 to 5.5g/oz).

High beta glucan content flours and flour blends of various beta glucan content are selected and employed at concentrations such as to provide the cereal composition with the above described barley beta glucan contents. Of course, modest amounts of conventional barley flour can also be employed as part of a flour blend along with a barley flour of higher beta glucan content so long as the cereal composition beta glucan contents and insoluble fiber content are within the descriptions given herein. Moreover, the beta glucan content supplied by the high beta glucan content flour can be modestly fortified with barley beta glucan gum and/or with other soluble gum sources, e.g., guar gum, pectin, gum arabic and mixtures thereof, if desired, e.g., up to one-third of the total soluble fiber content.

The concentration of high beta glucan barley flour can also be influenced by the desired final product specific density. When more highly puffed, i.e., lower specific density products are desired, the barley flour content may be within the lower portion of the herein specified range and other farinaceous ingredients, especially starches, are employed. Better overall product attribute results are obtained when the barley flour content ranges from about 30% to 75%. For best results the barley flour content should range from about 30% to 40%.

A variety of materials can be added to the present cereal compositions to make the present puffed R-T-E cereals more nutritious and more aesthetically or organoleptically desirable. Major optional ingredients usefully added include additional farinaceous or starchy materials, sucrose, and common salt.

For example, if desired, the present cereals can comprise one or more supplemental farinaceous materials. If present, such supplemental farinaceous material(s) can collectively comprise about 1% to 81% of the cereal composition, preferably about 6% to 81%, and for best results about 10% to 30%. Representative of these materials are cereal flours or starches such as those of wheat (hard or soft), corn, rice, buckwheat, arrowroot, oat, rye, tapioca, potato or any combination of two or more. However, if oat bran is added to the present cereals, the oat bran beta glucan content is importantly less than about 7%.

In a highly preferred embodiment, the present cereal compositions have total starch contents ranging between about 15% to 60%. The term "total starch content" refers to the combination of the naturally occurring starch present in the barley flour which may be used in the dough formulation plus the added starch in the formulation whether pure or associated with other flour ingredients. The term "added starch" is used to mean additional manufactured starches which have been separated from cereal grains and which have been added to the formulation to increase the starch content thereof.

Sucrose is another highly preferred optional cereal composition component. If present, sucrose can comprise from about 0.1% to 15% of the present cereal compositions and preferably between about 1% and 10%, and for best results about 1% to 5%. Sucrose not only provides sweetness but also favorably affects product texture and puff volume.

Another highly preferred optional component of the present cereal composition is common salt. In addition to its seasoning function, salt surprisingly has a beneficial effect upon the puffing ability of the cereal doughs. If present, salt comprises from about 0.1% to 10% of the dough, preferably between 0.5% to 5% and most preferably between 1% and 2%.

Minor optional cereal composition ingredients include, for example, colors, dyes, flavors, vitamins, preservatives and the like. If present, such minor optional components comprise from about 0.1% to 2% by weight of the cereal compositions.

Desirably, however, the present cereal compositions are formulated to have low fat contents since excessive fat levels in the cereal composition can adversely affect puff volume. Useful herein are cereal compositions having fat contents of less than about 4%. Such fat levels are those obtained when whole grain barley, i.e., including the high fat content germ fraction, are employed herein. In one embodiment, barley grain flours can comprise the germ fraction but preferably not the bran fraction for the nutritional value of the germ fraction. The associated barley oil contains fat soluble vitamins and other constituents believed to have health benefits, especially antihypercholesterolaemic benefits. However, both bran and fat fractions adversely affect puffed volume. Therefore, preferred compositions include less than about 3.5% fat, and for best results less than about 3%. These fat levels embrace the fat contribution of any added emulsifiers or other fat-like materials conventionally added to puffable cereal pellet compositions to aid preparation.

Cooking the Dry Blend to Form a Cooked Cereal Dough

In the next essential step, the essential dry materials such as barley flour(s) and starch, together with other optional ingredients such as sugar and salt, are next combined with controlled quantities of water and are cooked to form gelatinized doughs. Such gelatinized doughs, of course, can be prepared in various well-known manners. Either a batch cooking or continuous cooking operation can be used. Different methods of cooking includes heating at atmospheric pressure in an agitated kettle, heating at elevated pressure in a tumbling type mixer and heating under high pressure in a continuous mixer-extruder.

One preferred method herein of gelatinizing the starch material is by cooking in an extruder under pressure. Such a process is both continuous and flexible. For example, pregelatinized material, if used, can be simultaneously blended with the other starch material to yield an homogenous gelatinized dough. Additionally, the use of higher pressures attainable in the extruder allow the use of higher temperatures and also lower water levels than are possible with a batch type cooking operation. The use of lower water levels thus minimizes the amount of drying required in subsequent steps and is helpful in control of absorbed moisture. For example, using an extrusion type process at 100 to 200 psig at about 250° to 350° F., 25% to 45% water based on the total moisture is sufficient to gelatinize the dough.

It is important to control closely the amount of added water. Due to the high levels of soluble fiber, the present cereal compositions tend to absorb high levels of water. Cooked cereal doughs resulting from excessive water addition can be difficult to process in subsequent operations due to the tackiness or stickiness of the dough and resistance to drying. Better results are obtained when the cooked cereal doughs have a final moisture content of 35% to 40%. For best results, the moisture content upon completion of the cooking operation is about 38% moisture.

The cooking step is continued at sufficiently high temperatures and pressures for such times so as to gelatinize the starch. Even longer cook steps can also be used, if desired, such as to promote cooked cereal flavor development.

Forming the Cooked Cereal Dough into Shaped and Sized Pieces

In the next essential step, the cooked cereal dough thereafter is shaped into any desired geometric form or irregular shapes of individual or discreet puffable pieces although spherical pellets are preferred. For the preparation of small pellets, the dough can be extruded in a wide variety of equipment and the extrudate cut off in the form of small pellets ranging in size between about 2 mm to 20 mm in diameter and generally weighing between 0.01 to 6 g (after drying). Conventionally, pellet size is expressed in units referred to as "pellet count" which is the number of pellets which after drying are required to weigh 10 g. Good results are obtained when the pellets are size characterized by pellet counts ranging from 75 to 85, preferably 78 to 82.

Drying

After such shaping/sizing, the cooked cereal dough pellets are adjusted (e.g., partially dried) to a suitable puffing moisture within the essential 5% to 15% total moisture content range. Any method of conventional drying can be used to reduce the moisture content of the pellets. The drying operation can be accomplished using equipment such as rotary bed, tray and belt dryers to form the present dried dough pellets. Simple hot air convection drying is the preferred method of pellet drying.

The drying process must be controlled so that the moisture transfer to the atmosphere of the dryer from the pieces is more or less uniform, i.e., to avoid case hardening. If the moisture loss occurs only from the outer surface of the pellets while the inner portion of the pellets retains moisture, then the total moisture of the pellets may be within the required 5% to 15% range, but the pellets will not puff or expands properly during puffing. This poor puffing results from the starch material in the outer portions of the pre-formed pellets having little or no moisture with which to expand during the puffing step. If the air convection drying operation is carried out at about 70° to 200° F. (relative humidity at least 35%) the pellets will be dried within about four hours and the moisture distribution within the pellets will be proper.

The puffable pellets herein are prepared from puffable gelatinized farinaceous doughs which have moisture contents essentially ranging between about 15% to 30% by weight of the pellets' dough, preferably from between about 20% to 28% and, most preferably, between about 22% and 26%. Maintenance of pellet dough moisture contents within the above given ranges is important to ensure sufficient moisture to puff the pellets without scorching and to ensure extended pellet shelf storage stability.

Optionally, the present methods can comprise a tempering step. While useful, particular techniques can vary. The tempering operation generally involves subjecting the pellets before or after drying to a holding operation under conditions of controlled humidity and temperature so as to allow the moisture within the pellets to equilibrate. Useful tempering conditions of time, temperature and humidity can range from about 0.5 to 24 hours, preferably 2 to 8 hours at temperatures of about 100° to 200° F. and humidities of at least 35%.

The puffable pellets so prepared are useful products for the preparation of various puffed food products. By the term "puffable" it is meant the ability of the pellets or "pieces" to expand in volume upon puffing and to retain at least twice their original volume (hereinafter "2X") upon cooling. The term "piece" is used herein to refer to a shaped, gelatinized dough product which has not yet been subjected to sufficient heat to cause the product to puff. The term "pellet" as referred to in the art is used herein to refer to highly preferred puffable piece embodiments of roughly spherical shape and generally weighing between 0.01 and 6 grams. In the present description it is to be understood that puffable pieces of various shapes can be used even though pellets are specifically described. Highly preferred shapes for use herein include spheres, stars and torroids (i.e., "Oh's").

The pellets, especially larger sized pieces, are useful, for example, in the preparation of puffed, fried snacks by the rapid heating in a hot frying oil. The pellets can also be puffed by microwave heating or other rapid heating methods (e.g., jet zone puffing).

In other embodiments, the puffable cooked cereal dough can be directly expanded after extruder cooking to realize an extruder prepared expanded cooked cereal product.

Gun Puffing

In the most preferred embodiment, the present puffable pellets are puffed with steam in known manner to prepare a puffed R-T-E cereal piece. Generally, the pellets are heated with steam under pressure to superheat the pellets' moisture and then rapidly depressurized causing the moisture to flash off and the pellet to puff to form puffed R-T-E cereal pieces.

The present puffed R-T-E cereal products are characterized by specific densities ranging from about 0.09 to 0.13, preferably about 0.1 to 0.12 g/cc. The puffed R-T-E cereal products can also be density characterized by bulk densities. Particular bulk density values will also be influenced by piece size and shape, but only modestly. In commercial practice, bulk densities are used to express the weight of the product when packaged in a conventional standard sized carton, especially the smallest size, which typically has a volume of about 125 in³. The present puffed R-T-E products are essentially characterized by bulk densities ranging from about 100 to 300 g per 125 in³, (0.05 to 0.15 g/cc) preferably about 184 to 266 g per 125 in³ (0.09 to 0.13 g/cc). For best results, the products have bulk densities ranging from about 7 to 9 oz per 125 in³ (0.1 to 0.12 g/cc).

Sugar Coating

Thereafter, if desired, the puffed R-T-E cereal pieces can be supplied with a sugar coating to provide a presweetened puffed barley R-T-E cereal. Generally, a sugar syrup or slurry is enrobed over the R-T-E cereal pieces by tumbling in an enrober. If desired, the sugar coating solution can additionally further comprise flavors, spices, colors, vitamins, particulates (e.g., granola, fruit bits) and mixtures thereof. After enrobing, the coated R-T-E cereal pieces are finished dried to moistures of about 2% to 5% to form finished sugar coated puffed R-T-E cereals of the present invention. The R-T-E cereals so prepared can then be conventionally packaged and distributed. The skilled artisan will appreciate that application of a sugar coating will modify the finished pieces to increase both their specific and bulk densities. Typical specific densities of a sugar presweetened puffed R-T-E cereal are somewhat to the higher region of the present range and generally range from about 0.08 to 0.13 g/cc.

Industrial Application

The present invention finds particular suitability in the commercial preparation of R-T-E breakfast cereals. The present invention provides puffed, R-T-E cereals of desirable crunch and crispness notwithstanding the high levels of soluble fiber. The principal ingredient of the present R-T-E cereals is a high soluble fiber barley flour which ingredient can readily be obtained from milling certain widely available common varieties of barley.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of those in the food art, can be undertaken without departing from the spirit and scope of the invention.

EXAMPLE 1

A puffed ready-to-eat expanded cereal of the present invention having high levels of soluble fiber was prepared according to the following procedure. A dry blend and a sugar coating composition were made separately having the respective formulations:

| | Weight % |
|---|---|
| A. Base Dry Blend Ingredients | |
| High soluble fiber barley flour (20% SDF) | 63.00 |
| Wheat starch | 23.81 |
| Sugar | 6.00 |
| High soluble fiber oat bran fraction (20% SDF) | 5.00 |
| Salt | 1.20 |
| Trisodium phosphate | 0.30 |
| Calcium carbonate | 0.60 |
| Vitamin blend | 0.90 |
| | 100.00% |
| B. Sugar Slurry Ingredients | |
| Sugar | 60.00 |
| Water | 20.00 |
| Vanilla flavor | 5.00 |
| Corn syrup | 14.00 |
| Salt | 1.00 |
| | 100.00% |

Approximately 2,000 lb. (910 kg) of the base dry blend ingredients were blended for 15 minutes in a conventional ribbon blender. The ingredient mixture was then fed to a low pressure jacketed single screw cooker extruder at a feed rate of 8 pounds per minute. The cooker extruder operated at 6 RPM. Water was added to the cooker extruder at a rate of 5.2 pounds per minute. The residence time in the cooker extruder was about 60 minutes.

The extruder was fitted with a die configuration with a cutter blade that produced individual pellets from the cooked dough. The cutter speed at the die face was adjusted so that 10 grams of pelleted product contained 82-84 individual pellets. The pellet moisture was 19% to 25%. The cooked cereal dough pellets were then dried in a conventional pellet dryer for 31 minutes at 180° F. to a final moisture range of 8% to 13% with a target moisture of 10%.

The dried cereal pellets were preheated to approximately 450° F. at a pressure of 20-21 psig and were expanded by subjecting them to a pressure differential to form puffed cereal pieces. The bulk density of the expanded cereal was about 240 to 280 grams/125 cubic inches (0.12 to 0.137 g/cc) and the moisture was 4% to 6%.

The expanded product was then dried slightly in a conventional two pass dryer and was coated with sufficient amounts of the sugar slurry to produce a final product with approximately 25% added slurry. The coated product was dried to a final moisture of about 2% to 3% to form a sugar coated puffed barley R-T-E cereal product having a high soluble fiber content. The R-T-E cereal was then conventionally packaged.

The final product had a soluble fiber content of 3 g/oz. and an insoluble fiber content of 1 g/oz. giving a soluble to insoluble fiber weight ratio of 3:1. The sugar concentration of the coated R-T-E cereal was 21%.

EXAMPLE 2

A puffed ready-to-eat cereal composition of the present invention having high levels of soluble fiber was prepared according to the following procedure. A dry blend and a sugar slurry were prepared separately having the respective formulations:

|  | Weight % |
|---|---|
| A. Base Dry Blend Ingredients | |
| High protein pearled barley flour (20% SDF) | 63.00 |
| Modified tapioca starch | 23.81 |
| Sugar | 6.00 |
| High soluble fiber oat fraction (20% SDF) | 5.00 |
| Salt | 1.20 |
| Trisodium phosphate | 0.30 |
| Calcium carbonate | 0.60 |
| Vitamin blend | 0.90 |
|  | 100.00% |
| B. Sugar Slurry Ingredients | |
| Sugar | 60.00 |
| Water | 28.20 |
| Honey | 6.00 |
| Brown sugar syrup | 5.00 |
| Salt | 0.80 |
|  | 100.00% |

The dry blend ingredients and the sugar slurry ingredients were mixed separately and processed as described in Example 1 to form a puffed R-T-E cereal.

The bulk density of the puffed R-T-E cereal was about 0.10 g/cc. (16.39 cm³ = 1 in³). The soluble fiber content was about 14%, while the insoluble fiber content was about 7%.

EXAMPLE 3

A puffed ready-to-eat expanded cereal of the present invention having high levels of soluble fiber was prepared according to the following procedure. A dry blend and a sugar coating composition were made separately having the respective formulations:

|  | Weight % |
|---|---|
| A. Base Dry Blend Ingredients | |
| High soluble fiber barley flour (20% SDF) | 63.00 |
| Corn starch | 23.81 |
| Sugar | 6.00 |
| High soluble fiber oat bran fraction (20% SDF) | 5.00 |
| Salt | 1.20 |
| Trisodium phosphate | 0.30 |
| Calcium carbonate | 0.60 |
| Vitamin blend | 0.80 |
|  | 100.00% |
| B. Sugar Slurry Ingredients | |
| Sugar | 60.00 |
| Water | 20.00 |
| Vanilla flavor | 5.00 |
| Corn syrup | 14.00 |
| Salt | 1.00 |
|  | 100.00% |

The dry blend ingredients and the sugar slurry ingredients were mixed separately and processed as described in Example 1 to form a puffed R-T-E cereal.

The bulk density of the puffed R-T-E cereal was about 0.10 g/cc. (16.39 cm³ = 1 in³). The soluble fiber content was about 14%, while the insoluble fiber content was about 7%.

EXAMPLE 4

A puffed ready-to-eat cereal composition of the present invention having high levels of barley soluble fiber was prepared according to the following procedure. A dry blend, a wet blend, and a sugar coating composition were separately formed having the respective formulations:

| Ingredients | Weight % |
|---|---|
| A. Base Dry Blend | |
| Oat bran | 41.50 |
| Rice flour | 35.70 |
| Barley flour - 50% beta glucan | 10.00 |
| Sugar beet fiber | 6.30 |
| Wheat bran | 2.10 |
| Sucrose | 2.42 |
| Guar gum | 1.25 |
| Sodium bicarbonate | 0.35 |
| Trisodium phosphate | 0.30 |
| Vitamin blend | 0.08 |
|  | 100.00% |
| B. Malt Syrup/Color Blend | |
| Malt syrup | 44.20 |
| Corn syrup | 44.10 |
| Food grade color | 11.60 |
| Potassium sorbate | 0.10 |
|  | 100.00% |
| C. Sugar Slurry | |
| Sugar | 60.00 |
| Water | 28.20 |
| Honey | 6.00 |
| Brown sugar syrup | 5.00 |

-continued

| Ingredients | Weight % |
|---|---|
| Salt | 0.80 |
| | 100.00% |

About 2,000 lb (910kg) of the base dry blend ingredients were blended for 15 minutes in a conventional ribbon blender equipped with a wet blend/dry blend bladed mixer. Sufficient amounts of the Malt/Color blend (about 34 lbs per 2000 lbs base) were added to the blended dry ingredients, and this mixture was further blended for an additional five minutes. The ingredients mixture was then fed to a low pressure single screw cooker extruder equipped with a precooker conditioner with sufficient water to completely cook the mixture to a moisture content of about 35%. The residence time in the conditioner was about 30 min. The conditioner operating pressure was ambient pressure. The cooked cereal base was then extruded as several ropes of dough. The cooked dough ropes were then sheeted with standard cereal dough sheeting equipment. After sheeting, the cooked dough sheet was cut into strips, which in turn was cut again into cereal pieces approximately ½ inch by 3/16 inch to form pellets. The cooked cereal dough pellets were then dried in a conventional pellet dryer to a final moisture range of 22% to 27%, with a target moisture of 25%. The dried cereal pellets were then puffed with standard cereal puffing equipment to a final bulk density of 0.16 to 0.18 g/cc. The puffed cereal pieces were then coated with sufficient sugar slurry to produce a final product with approximately 10% added slurry. The coated cereal pieces were then dried to a final moisture of about 2.0%. The puffed high soluble fiber R-T-E cereal so prepared was then conventionally packaged.

The final product had a soluble fiber content of 3.0 g/oz and an insoluble fiber content of 3.0 g/oz giving a soluble to insoluble fiber ratio of 1:1. The barley beta glucan content is about 6% to 8%. The total fat content was less than 4%. Upon consumption, the R-T-E cereal exhibited a clean flavor and crispy texture profile that is typical of puffed whole grain cereals but is without a gummy, slimy mouthfeel.

EXAMPLE 5

A puffed ready-to-eat cereal composition of the present invention having high levels of soluble fiber is prepared according to the following procedure. A dry blend, a wet blend and a sugar coating composition were separately prepared having the respective formulations:

| Ingredients | Weight % |
|---|---|
| A. Dry Base Blend | |
| Whole wheat | 66.32 |
| Barley flour - 18% beta glucan | 15.00 |
| White wheat bran | 8.00 |
| Sugar | 7.50 |
| Salt | 1.50 |
| Guar gum | 1.20 |
| Vitamin blend | 0.40 |
| Trisodium phosphate | 0.08 |
| | 100.00% |
| B. Malt Syrup Slurry | |
| Water | 92.00 |
| Cereal malt syrup | 7.90 |

| Ingredients | Weight % |
|---|---|
| Food coloring (e.g. Annatto) | 0.10 |
| | 100.00% |
| C. Sugar Slurry | |
| Sugar | 60.00 |
| Water | 28.20 |
| Honey | 6.00 |
| Brown sugar syrup | 5.00 |
| Salt | 0.80 |
| | 100.00% |

About 1,000 kg of dry base ingredients are blended for approximately 15 minutes in a conventional ribbon blender. The dry salt and sugar are weighed out separately and added to the malt syrup slurry mixture. The vitamin blend is also weighed out separately. Sufficient quantities of the malt syrup slurry (about 0.5 kg slurry for each kg of dry base mixture), are prepared in a conventional steam jacketed mixing kettle. The dry base and the prepared slurry are then added to a rotating batch cooker. The base and slurry mixture are then rotated for about 5 minutes to allow adequate mixing. The ingredients are then cooked for 55 minutes at 25 psig steam pressure with processing vents of pressure after 15 minutes and again after 35 minutes elapsed time. Following cooking, the cooked cereal dough is allowed to cool and pelletized in a pelletizing extruder (Ambrette Co.). The pellets are then dried in a conventional pellet dryer to a final moisture of 23% to 27%, with a target moisture of 25%. The dried pellets are then tempered for 45 to 60 minutes at ambient temperature in a conventional tempering belt system. The tempered pellets are then puffed using standard cereal puffing equipment to a density of about 0.14 to 0.16g/cc. The puffed cereal pieces are then coated with sufficient sugar slurry to produce a final product with approximately 10% added slurry.

If desired, additional vitamins may be added to the sugar slurry. Application rates can be easily selected, depending on the final level of fortification desired.

The final product has a soluble fiber content of 3.3 g/oz and an insoluble fiber content of 3.2 g/oz giving a soluble to insoluble fiber ratio of 1:1. The total fructose concentration of the sugar coated R-T-E cereal is about 5%. The total fat content is less than 2%. The beta glucan content is about 2% to 3%. Upon consumption, the puffed R-T-E cereal exhibits a pleasing, typical bran cereal flavor and texture profile, without a gummy or slimy mouthfeel.

EXAMPLE 6

A puffed R-T-E cereal of the present invention having high levels of barley soluble fiber is prepared according to the following procedure. A dry blend, a wet blend and a sugar coating composition were separately prepared having the respective formulations:

| Ingredients | Weight % |
|---|---|
| A. Dry Base Blend | |
| Yellow corn cones | 37.25 |
| Oat bran | 27.00 |
| Barley flour - 45% beta glucan | 24.00 |
| Sugar | 5.00 |
| Heavy wheat bran | 4.00 |
| Guar gum | 1.20 |

-continued

| Ingredients | Weight % |
|---|---|
| Salt | 0.50 |
| Sodium bicarbonate | 0.35 |
| Trisodium phosphate | 0.30 |
| Vitamin blend | 0.40 |
| | 100.00% |
| B. Malt Syrup/Color Blend | |
| Malt syrup | 44.20 |
| Corn syrup | 44.10 |
| Food grade color | 11.60 |
| Potassium sorbate | 0.10 |
| | 100.00% |
| C. Sugar Slurry | |
| Sugar | 60.00 |
| Water | 28.20 |
| Honey | 6.00 |
| Brown sugar syrup | 5.00 |
| Salt | 0.80 |
| | 100.00% |

About 1,000 kg of dry base are mixed, blended and processed as described in Example 1 to form puffed R-T-E cereal pieces. The final moisture of the extruded ropes is about 35%. The sugar coating processes are the same as those given in previous examples. The final product has a soluble fiber content of 5.4 g/oz and an insoluble fiber content of 1.8 g/oz giving a soluble to insoluble fiber ratio of 3:1. The total fructose content of the sugar coated flake is less than 5%. The total fat content is less than 4%. The beta glucan content is 11% to 13%.

EXAMPLE 7

An R-T-E cereal of the present invention is prepared according to the following procedure:

| Ingredients | Weight % |
|---|---|
| A. Dry Base Blend | |
| Oat bran | 30.00 |
| Yellow corn cones | 28.00 |
| Barley beta glucan | 16.00 |
| (30% beta glucan) | |
| High methoxyl pectin | 13.50 |
| Dent corn starch | 9.60 |
| Guar gum | 1.20 |
| Salt | 0.50 |
| Sodium bicarbonate | 0.50 |
| Vitamin blend | 0.40 |
| Trisodium phosphate | 0.30 |
| | 100.00% |
| B. Corn Syrup Blend | |
| High fructose corn syrup | 99.60 |
| Food coloring | 0.40 |
| | 100.00% |
| C. Aspartame Sweetener | |
| Water | 97.00 |
| Aspartame | 2.70 |
| Xanthan gum | 0.30 |
| | 100.00% |

About 1,000 kg of the dry base mixture are blended in conventional ribbon blender. The corn syrup blend is mixed separately. The cereal base is cooked in a high-temperature, short-time (HTST) single screw extruder cooker equipped with a steam injected conditioner. The extruder is fitted with a die configuration that will produce about 30 to 40 individual ropes of cooked dough, each being approximately 0.12 inches in diameter. Sufficient water is added to the extruder to achieve a moisture of about 15% to 20% in the extruded dough. The corn syrup blend is pumped into the conditioner with a pump suitable for delivery of viscous fluids, and at a rate sufficient to result in a final product with approximately 8% added corn syrup. The color level in the blend may be adjusted as desired. The individual extruded ropes are then cut to desired length with a suitable high-speed cutter. The cut cereal pieces are then puffed in a conventional cereal puffing gun. Following toasting, the puffed cereal pieces are coated with the high-potency artificial sweetener. The aspartame mixture is homogenized, and atomized onto the surface of the cereal at a rate sufficient to produce a final product with about 0.04% added aspartame. The high soluble fiber R-T-E cereal so prepared was conventionally packaged.

The final product has a soluble fiber content of 6.4 g/oz and an insoluble fiber content of 1.3 g/oz giving a soluble to insoluble fiber ratio of 5:1. The total fructose content of the cereal is about 3% to 4%. The soluble fiber content is about 22.8%. The total fat content is less than 4%. The bulk density is about 0.17 g/cc.

What is claimed is:

1. A puffed ready-to-eat cereal product of superior eating quality which is high in soluble fiber, comprising a puffed, cooked cereal dough composition including:
    A. about 15% to 90% by weight of the composition of a barley extraction flour having a soluble fiber content of about 15% to 50% by weight of the flour;
    B. about 2% to 4% moisture by weight of the composition, and the balance of the composition of a farinaceous material;
    wherein the product has a bulk density ranging from about 0.05 to 0.15 g/cc,
    wherein the insoluble fiber content is less than 7% by weight, and
    wherein the soluble fiber to insoluble fiber content is in a ratio of at least 1:1.

2. The food product of claim 1
    wherein the barley extraction flour is made from a barley pearled to between about 70% to 85%.

3. The food product of claim 2
    wherein the barley extraction flour is made from a barley pearled to between about 70% to 80% and has a barley beta glucan content of about 15% to 30% by weight of the flour.

4. The food product of claim 3, additionally comprising:
    C. about 6% to 81% by weight of the composition of a second farinaceous ingredient;
    wherein the cereal composition has an insoluble fiber content of less than 5% by weight, and
    wherein the soluble to insoluble fiber ratio is at least 2:1.

5. The food product of claim 4 in the form of ready-to-eat cereal pieces Fanging from about 0.05 to 2.5 g in weight.

6. The food product of claim 5, comprising:
    A. about 40% to 75% by weight of the composition of barley flour;
    B. about 2% to 4% moisture by weight of the composition;
    C. about 6% to 40% by weight of the composition of the second farinaceous ingredient;
    D. about 1% to 15% sugar(s); and
    E. about 0.1% to 4% by weight of the composition of salt.

7. The food product of claim 6 wherein the fat content is less than 5% by weight of the composition.

8. The food product of claim 7 wherein the R-T-E cereal piece is presweetened with a sweetener coating.

9. The food product of claim 8 wherein the composition comprises:
F. about 1% to 10% by weight of a nutritive carbohydrate sweetening agent; and
G. about 0.1% to 2% by weight of salt.

10. A food product in the form of a pellet useful in the production of a farinaceous puffed food piece fabricated from a cooked cereal dough composition, comprising:
A. about 15% to 96% by weight of the composition of a barley extraction flour having a soluble fiber content of about 15% to 50% by weight of the flour and an insoluble fiber content of less than about 4%;
B. about 2% to 4% moisture by weight of the composition and the balance of the composition of a second farinaceous material;
wherein the product has a density ranging from about 0.2 to 0.35 g/cc,
wherein the insoluble fiber content is less than 7% by weight, and
wherein the soluble fiber to insoluble fiber content is in a ratio of at least 1:1.

11. The food product of claim 10 wherein the barley extraction flour is made from a barley pearled to between about 70% to 85%.

12. The food product of claim 11 wherein the barley extraction flour is made from a barley pearled to between about 70% to 80% and has a barley beta glucan content of about 15% to 30% by weight of the flour.

13. The food product of claim 12, additionally comprising:
C. about 6% to 81% by weight of the composition of a second farinaceous ingredient; and
wherein the cereal composition has an insoluble fiber content of less than 5% by weight and wherein the soluble to insoluble fiber ratio is at least 2:1.

14. The food product of claim 13 in the form of ready-to-eat cereal pieces ranging from about 0.05 to 2.5 g in weight.

15. The food product of claim 14, comprising:
A. about 40% to 75% by weight of the composition of barley flour;
B. about 2% to 4% moisture by weight of the composition; and
C. about 6% to 40% by weight of the composition of the second farinaceous ingredient;
D. about 1% to 15% by weight of the composition of sugar(s); and
E. about 0.1% to 4% by weight of the composition of salt.

16. The food product of claim 15 wherein the fat content is less than 3% by weight of the composition.

17. The food product of claim 16 wherein the composition comprises:
D. about 1% to 10% by weight of a nutritive carbohydrate sweetening agent; and
E. about 0.1% to 2% by weight of salt.

18. A method for preparing a pellet useful in the preparation of a puffed cereal product high in soluble fiber, comprising the steps of:
A. forming a cooked cereal dough containing
1. a barley flour having a barley beta glucan content of about 15% to 50% by weight of the flour in sufficient amounts to provide a barley beta glucan content ranging from about 15% to 30% by weight (dry basis) of the dough,
2. about 35% to 40% moisture,
wherein the dough has a fat content of less than about 4% fat by weight (dry basis),
wherein the soluble fiber to insoluble fiber has a weight ratio of at least 1:1;
B. forming the cooked cereal dough into shaped and sized pellets;
C. drying the pellets without case hardening to form dried puffable pellets having a moisture content of about 5% to 15% by weight and having a weight ranging from about 0.1 to 2.5 g.

19. The method of claim 18 wherein the barley extraction flour is made from a barley pearled to between about 70% to 85%.

20. The method of claim 19 wherein the barley extraction flour is made from a barley pearled to between about 70% to 80% and has a barley beta glucan content of about 15% to 30% by weight of the flour.

21. The method of claim 20 wherein the dough additionally comprises:
3. about 6% to 81% by weight of the composition of a second farinaceous ingredient; and
wherein the cereal composition has an insoluble fiber content of less than 5% by weight and wherein the soluble to insoluble fiber ratio is at least 2:1.

22. The method of claim 21 wherein the pellets range from about 0.05 to 2.5 g in weight.

23. The method of claim 22, wherein the dough comprises:
A. about 40% to 75% by weight (dry basis) of the dough of barley flour;
B. about 2% to 4% moisture by weight of the dough;
C. about 6% to 40% by weight of the dough (dry basis) of the second farinaceous ingredient;
D. about 1% to 15% by weight of the dough (dry basis) of sugar(s); and
E. about 0.1% to 4% by weight of the dough (dry basis) of salt.

24. A method for making a puffed cereal product high in soluble fiber, comprising the steps of:
A. forming a cooked cereal dough containing
1. a barley flour having a barley beta glucan content of about 15% to 50% by weight of the flour in sufficient amounts to provide a barley beta glucan content ranging from about 15% to 30% by weight (dry basis) of the dough,
2. about 35% to 40% moisture
wherein the dough has a fat content of less than about 4% fat by weight (dry basis),
wherein the soluble fiber to insoluble fiber has a weight ratio of at least 2:1;
B. forming the cooked cereal dough into shaped and sized pellets;
C. drying the pellets to form dried puffable pellets having a moisture content of about 5% to 15% by weight and having a weight ranging from about 0.1 to 2.5 g; and
D. puffing the pellets to form puffed cereal pieces having a bulk density ranging from about 0.05 to 0.15 g/cc.

25. The method of claim 24 wherein the barley extraction flour is made from a barley pearled to between about 70% to 85%.

26. The method of claim 25 wherein the barley extraction flour is made from a barley pearled to between about 70% to 80% and has a barley beta glucan content of about 15% to 30% by weight of the flour.

27. The method of claim 26, additionally comprising: about 6% to 81% by weight of the composition of a second farinaceous ingredient; and wherein the cereal composition has an insoluble fiber content of less than 5% by weight.

28. The method of claim 27 wherein the pellets range from about 0.05 to 2.5 g in weight.

29. The method of claim 28 wherein the dough comprises:

A. about 40% to 75% by weight of the dough (dry basis) of barley flour;
B. about 2% to 4% moisture by weight of the dough and
C. about 6% to 40% by weight of the dough (dry basis) of the second farinaceous ingredient;
D. about 1% to 15% by weight of the dough (dry basis) of sugar(s); and
E. about 0.1% to about 4% by weight of the dough (dry basis) of salt.

30. The method of claim 29, additionally comprising the steps of:

F. enrobing the puffed cereal pieces with a sugar solution to form sugar coated puffed R-T-E pieces;
G. drying the sugar coated puffed R-T-E cereal pieces to a moisture content of about 2% to 5% by weight.

* * * * *